(12) United States Patent
Morita et al.

(10) Patent No.: US 6,764,038 B2
(45) Date of Patent: Jul. 20, 2004

(54) MAGNETIC TAPE CARTRIDGE (75) Inventors: Kiyoo Morita, Kanagawa (JP); Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/050,112

(22) Filed: Jan. 18, 2002

(65) Prior Publication Data

US 2002/0096590 A1 Jul. 25, 2002

(30) Foreign Application Priority Data

Jan. 19, 2001 (JP) .......................................... 2001-011203

(51) Int. Cl.[7] .............................................. G11B 23/107
(52) U.S. Cl. ................................................... 242/348.2
(58) Field of Search ............................... 242/338.1, 340, 242/345, 345.1, 347, 348, 348.1, 348.2, 348.3, 348.4; 360/132

(56) References Cited

U.S. PATENT DOCUMENTS

| 3,537,780 A | * | 11/1970 | Angenieux | ................. | 352/78 R |
| 3,606,185 A | * | 9/1971 | Martin | ......................... | 242/329 |
| 3,655,145 A | * | 4/1972 | Olsen | ......................... | 242/348.2 |
| 3,662,972 A | * | 5/1972 | Egan | ........................... | 242/348.2 |
| 3,677,497 A | * | 7/1972 | Lowry et al. | ............. | 242/345.1 |
| 3,684,211 A | * | 8/1972 | Takeichi et al. | .......... | 242/348.2 |
| 3,686,767 A | * | 8/1972 | Duda et al. | .................... | 33/769 |
| 3,744,737 A | * | 7/1973 | Anderson | .................... | 242/337 |
| 3,834,650 A | * | 9/1974 | Hall | ............... | 242/348 |
| 6,034,850 A | * | 3/2000 | Del Genio et al. | .......... | 360/132 |

FOREIGN PATENT DOCUMENTS

| DE | 2166321 | * | 12/1973 | ................. | 242/348 |
| GB | 2099399 | | * | 12/1982 | ............... | 242/338.1 |

* cited by examiner

Primary Examiner—Kathy Matecki
Assistant Examiner—Scott J. Haugland
(74) Attorney, Agent, or Firm—Sughrue Mion, PLLC

(57) ABSTRACT

A magnetic tape cartridge has a single reel including a circular lower flange and a circular upper flange, a magnetic tape which is wound between the upper flange and the lower flange and a cartridge case including a lower case and an upper case. The upper flange closes a circular second opening of the upper case to form a central portion on an upper side of the cartridge case. It has become possible to provide a magnetic tape cartridge that has a reduced total thickness and is also advantageous in terms of costs. A magnetic tape cartridge can be also realized which is unlikely to be damaged even if it is subjected to careless handling.

14 Claims, 5 Drawing Sheets

MAGNETIC TAPE CARTRIDGE

BACKGROUND OF THE INVENTION

1. Field of the Invention

The present invention relates to a magnetic tape cartridge and, more particularly, to a magnetic tape cartridge in which a single reel wound with a magnetic tape is rotatably housed or accommodated within a generally rectangular cartridge case.

2. Description of the Related Art

Conventionally, there is known a magnetic tape cartridge of a type in which a single reel wound with a magnetic tape is rotatably housed in a cartridge case (hereinafter referred to as a one-reel type) as one used as a storage medium employed for an external storage apparatus such as a computer.

Figure 7:
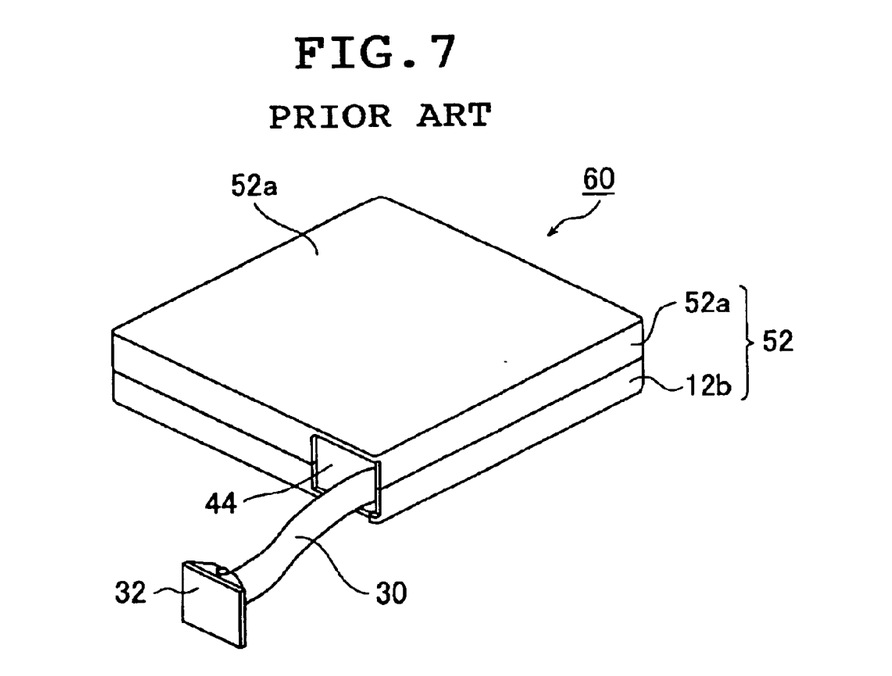
FIG. 7 is a perspective view showing an external appearance of a conventional general magnetic tape cartridge of a one-reel type.
Figure 8:
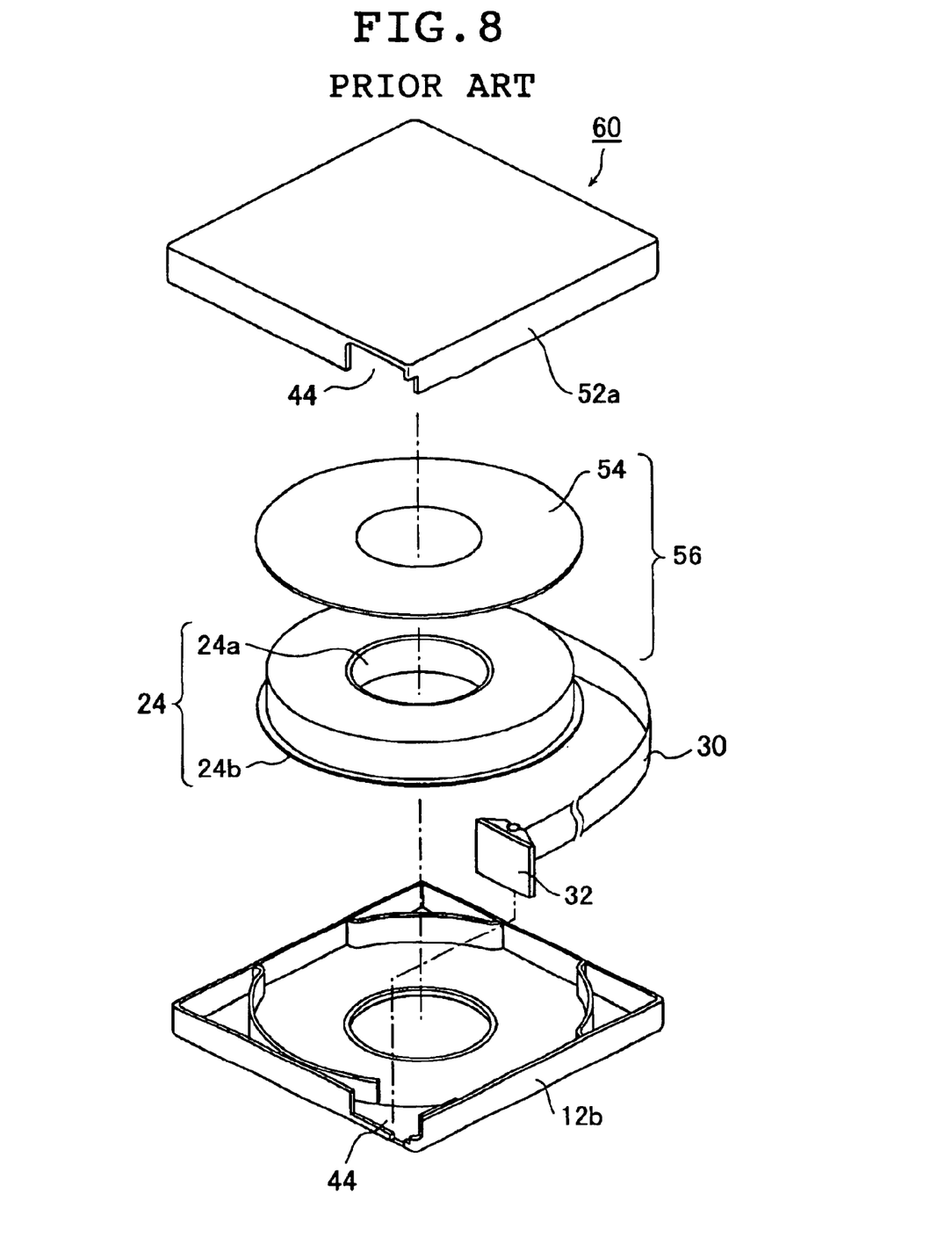
FIG. 8 is an exploded perspective view showing a schematic configuration of the magnetic tape cartridge shown in FIG. 7.

Functions of the above-mentioned magnetic tape cartridge of the one-reel type will be described referring to a representative example of its configuration. FIG. 7 is a perspective view showing an external appearance of a conventional general magnetic tape cartridge of the one-reel type. FIG. 8 is an exploded perspective view showing a schematic configuration of the conventional magnetic tape cartridge shown in FIG. 7.

In the magnetic tape cartridge 60 shown in FIGS. 7 and 8, a magnetic tape 30 is wound around a single reel 56, which is composed of a lower flange 24 and an upper flange 54 being bonded by ultrasonic welding or the like, and the reel 56 rotatably housed in a cartridge case 52 that is composed of an upper case 52a and a lower case 12b being fastened to each other by machine screws (not shown) or the like.

Here, the above-described lower flange 24 is composed of a cylindrical reel hub 24a around the circumference of which the magnetic tape 30 is wound and a flange portion 24b projecting from the lower end circumference of this reel hub 24a in the radial direction, which are integrally molded with synthetic resin. A reel plate (not shown) or the like for magnetically joining a rotary driving unit for rotationally driving the reel 56, which is provided in a drive mechanism (hereinafter referred to as a drive) of a recording/reproducing apparatus such as an external storage apparatus, is attached on the lower surface of the lower flange 24, that is, on the bottom external surface of the reel hub 24a.

The above-mentioned magnetic rotary driving unit engages with a driving gear formed around the lower surface of the reel plate to thereby rotate the reel 56. Simultaneously with this, a leader block 32 or the like to be described later is drawn out to a predetermined position in a tape travelling path of the drive, whereby data can be read from and written in the magnetic tape 30.

When the magnetic tape cartridge 60 is not used, the leader block 32 (a unit with which the drive having loaded the magnetic tape cartridge 60 introduces the magnetic tape 30 into the tape travelling path within the apparatus) is held at an opening 44 for drawing out the magnetic tape 30, which is formed on one side wall surface of the cartridge case (hereinafter also referred to simply as a case) 52, with the magnetic tape 30 being completely wound around the reel 56.

That is, when the magnetic tape cartridge 60 of such a one-reel type is set in the drive of the external storage apparatus, the magnetic tape 30 wound around the reel 56 is drawn out from the case 52 by the tape driving mechanism on the drive side and thus information is recorded in a magnetic recording unit of the external storage apparatus (or information already recorded is read out in a reproducing unit). Then, after such objective processing is finished, the magnetic tape 30 is rewound around the reel 56 in the magnetic tape cartridge 60 to be housed in the case 52 again.

Incidentally, a magnetic tape cartridge of such a one-reel type has a disadvantage in that its thickness (i.e., its height in the reel axial direction) is large. In addition, since the magnetic tape cartridge requires many components, it is not easy to reduce its manufacturing cost.

The former disadvantage of large thickness poses a significant problem not only for the magnetic tape cartridge but also for the entire system in that it is inevitable to enlarge the driving mechanism on an external storage apparatus side as well, in which the magnetic tape cartridge is loaded to be used. In addition, the latter disadvantage of the large number of components contributes to the difficulty in decreasing the costs of components and the costs for assembling the magnetic tape cartridge 60.

These disadvantages are ultimately attributable to the fact that the conventional magnetic tape cartridge is configured to house a reel wound with a magnetic tape in a cartridge case or a cassette case (hereinafter referred to simply as a cartridge case) and to rotate the reel within the cartridge case, as in the cases of other well-known magnetic tape cartridges or magnetic tape cassettes and the like.

That is, from a conventional and ordinary point of view, a reel wound with a magnetic tape and a cartridge case that is a protecting unit and houses the reel exist for entirely different reasons (purposes) and are independent components, and these components are combined to construct a magnetic tape cartridge and a magnetic tape cassette.

Therefore, although these components are provided with parts that overlap with each other, such parts are left as they are. Moreover, conventionally, there have been made no discussions as to how the overall construction should be designed by fundamentally reviewing functions of these components.

In addition, in the magnetic tape cartridge 60 of the one-reel type having the above-mentioned construction as illustrated, the above-mentioned opening 44, which becomes a passage for drawing out and rewinding the magnetic tape 30, is provided relatively close to the corner of the cartridge case 56. Thus, if the magnetic tape cartridge 60 is accidentally subjected to careless handling such as rough handling or dropping thereof, the opening 44 is likely to be damaged.

That is, in the conventional magnetic tape cartridge 60, since the above-mentioned opening 44 is provided relatively close to the corner of the cartridge case 56 due in part to the configuration of the drive side, the magnetic tape cartridge 60 is inevitably low in mechanical strength and rigidity due to its structure and is likely to be damaged when it is subjected to careless handling.

SUMMARY OF THE INVENTION

The present invention has been devised in view of the above and other drawbacks, and it is a first object of the present invention to provide a magnetic tape cartridge that can eliminate the above-mentioned disadvantages in the prior art and reduce the number of components and costs as well as its overall thickness while maintaining respective functions of a reel and a cartridge case when constructing the magnetic tape cartridge by combining the reel and the cartridge.

In addition, it is a second object of the present invention to provide a magnetic tape cartridge that is made unlikely to be damaged even if it is subjected to careless handling such as rough handling or dropping thereof.

In order to attain the first object described above, the first aspect of the present invention provides a magnetic tape cartridge comprising: a single reel including a circular lower flange in which an engaging portion for engaging a rotary shaft of a recording/reproducing apparatus is centered, and a circular upper flange which is arranged so as to be opposed to the lower flange and has an outer diameter larger than the outer diameter of the lower flange; a magnetic tape which is wound between the upper flange and the lower flange; and a cartridge case within which the single reel is rotatably accommodated and which includes a lower case into which the rotation shaft is inserted and which has a first opening at a position corresponding to the engaging portion of the lower flange, and an upper case which has a circular second opening having an inner diameter larger than the outer diameter of the lower flange but smaller than the outer diameter of the upper flange; wherein the upper flange closes the circular second opening of the upper case to form a central portion on an upper side of the cartridge case.

That is to say, the magnetic tape cartridge of the first aspect of the present invention comprises a generally rectangular cartridge case in which a single reel wound with a magnetic tape is rotatably housed, wherein one of two flanges composing the reel constitutes a central main portion of one side (an upper side) of the cartridge case. It is preferable that the central main portion of a side, which becomes an upper side when the magnetic tape cartridge is loaded into a recording/reproducing apparatus, is constituted by the upper flange that is one of the two flanges composing the reel.

Preferably, the upper case comprises a circular cutout portion which is provided on an upper side of the upper case along the circular second opening and has an inner diameter larger than the outer diameter of the upper flange, and the upper flange comprises an annular stepped portion which is provided circumferentially on a lower side of the upper flange and fits in the circular cutout portion of the upper case from an upper side.

That is to say, it is preferable that a circular cutout portion larger in size than the upper flange is formed on the upper surface of the cartridge case, and a stepped portion of the upper flange formed to have a step fits in the cutout portion.

Preferably, a movement preventing unit for preventing relative movement (pivot or rotational movement, rotation) of the upper case of the cartridge case and the upper flange is formed on an upper side of the circular cutout portion of the upper case and a lower side of the stepped portion of the upper flange abutting the upper side of the circular cutout portion.

Preferably, the single reel is mounted in the cartridge case by means of its dead weight and the movement preventing unit functions also by means of the dead weight of the reel and a weight of the magnetic tape wound around the reel.

Preferably, at least two reel engaging units are provided on an upper side of the upper case to engage the upper flange and prevent the single reel from being unwantedly disengaged from the cartridge case.

Preferably, the reel engaging unit includes an urging unit for urging the upper flange toward the upper case.

Preferably, engagement of the upper flange of the single reel by the reel engaging unit is released when the magnetic tape cartridge is loaded into the recording/reproducing apparatus. The reel engaging unit may be movable within an identical plane such that the engagement of the reel is released in case of loading the magnetic tape cartridge into the recording/reproducing apparatus such as an external storage apparatus.

Preferably, a magnetic tape drawing-out port, which becomes a passage for drawing out the magnetic tape from the cartridge case and rewinding the magnetic tape into the cartridge case, is provided on a side surface of the cartridge case at a position apart from a corner of the cartridge case.

In order to attain the second object described above, the second aspect of the present invention provides a magnetic tape cartridge comprising a generally rectangular cartridge case in which a single reel wound with a magnetic tape is rotatably housed, wherein a magnetic tape drawing-out port, which becomes a passage for drawing out the magnetic tape from the cartridge case and rewinding the magnetic tape into the cartridge case, is provided on a side surface of the cartridge case at a position apart from a corner of the cartridge case.

In each aspect of the present invention, it is preferable that the magnetic tape drawing-out port is provided between a position corresponding to a screw hole used for assembling upper and lower cases and provided in the corner of the cartridge case, and a position corresponding to a reference hole provided in the vicinity of a central portion of the cartridge case.

Preferably, a central position of the magnetic tape drawing-out port is located at a position apart from the corner of the cartridge case by a distance equivalent to approximately one quarter of an edge length of the side surface of the cartridge case.

It should be noted that the first and second aspects of the present invention described above can obtain the corresponding effects to the combination of the above first and second aspects by applying the combination.

DETAILED DESCRIPTION OF THE PREFERRED EMBODIMENTS

Figure 1:
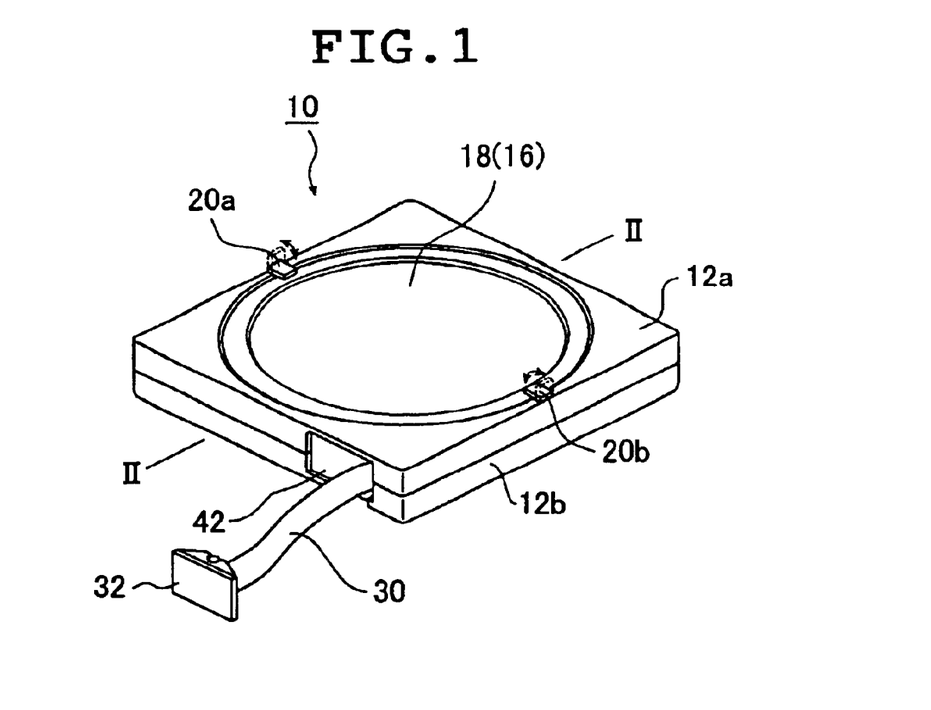
FIG. 1 is a perspective view showing a schematic configuration of an embodiment of a magnetic tape cartridge in accordance with the present invention.
Figure 2:
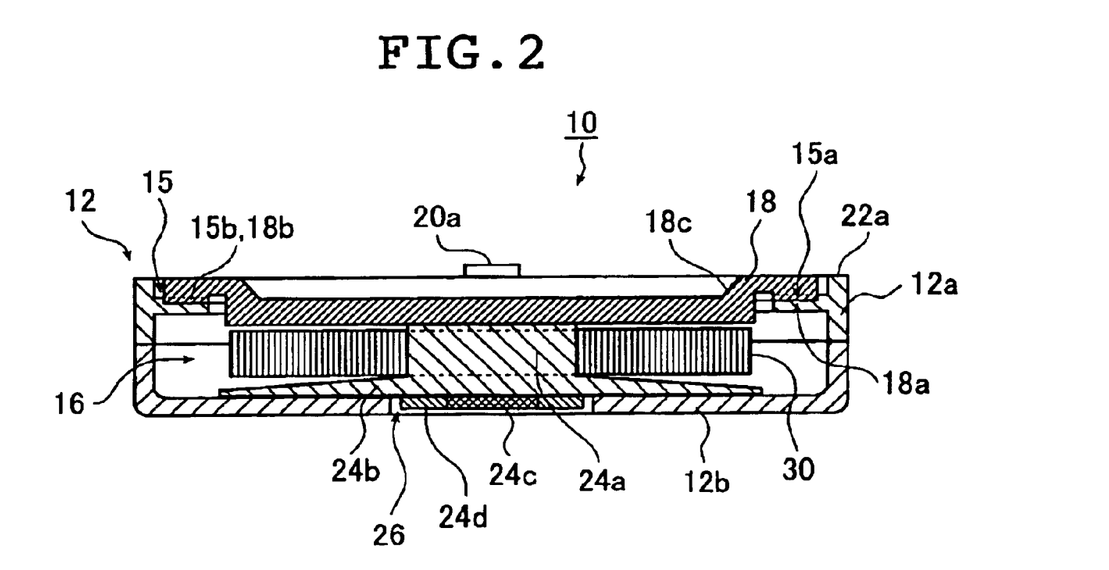
FIG. 2 is a sectional view of the magnetic tape cartridge shown in FIG. 1 cut across a plane passing through a line II—II.

A magnetic tape cartridge in accordance with the present invention will be described in detail based on embodiments shown in the attached drawings. FIG. 1 is a perspective external view showing a schematic configuration of an embodiment of the magnetic tape cartridge in accordance with the present invention. FIG. 2 is a sectional view of the magnetic tape cartridge cut across a plane passing through a line II—II which is a center line between two reel stoppers to be described later. In addition, FIG. 3 is an exploded perspective view of the magnetic tape cartridge.

Figure 3:
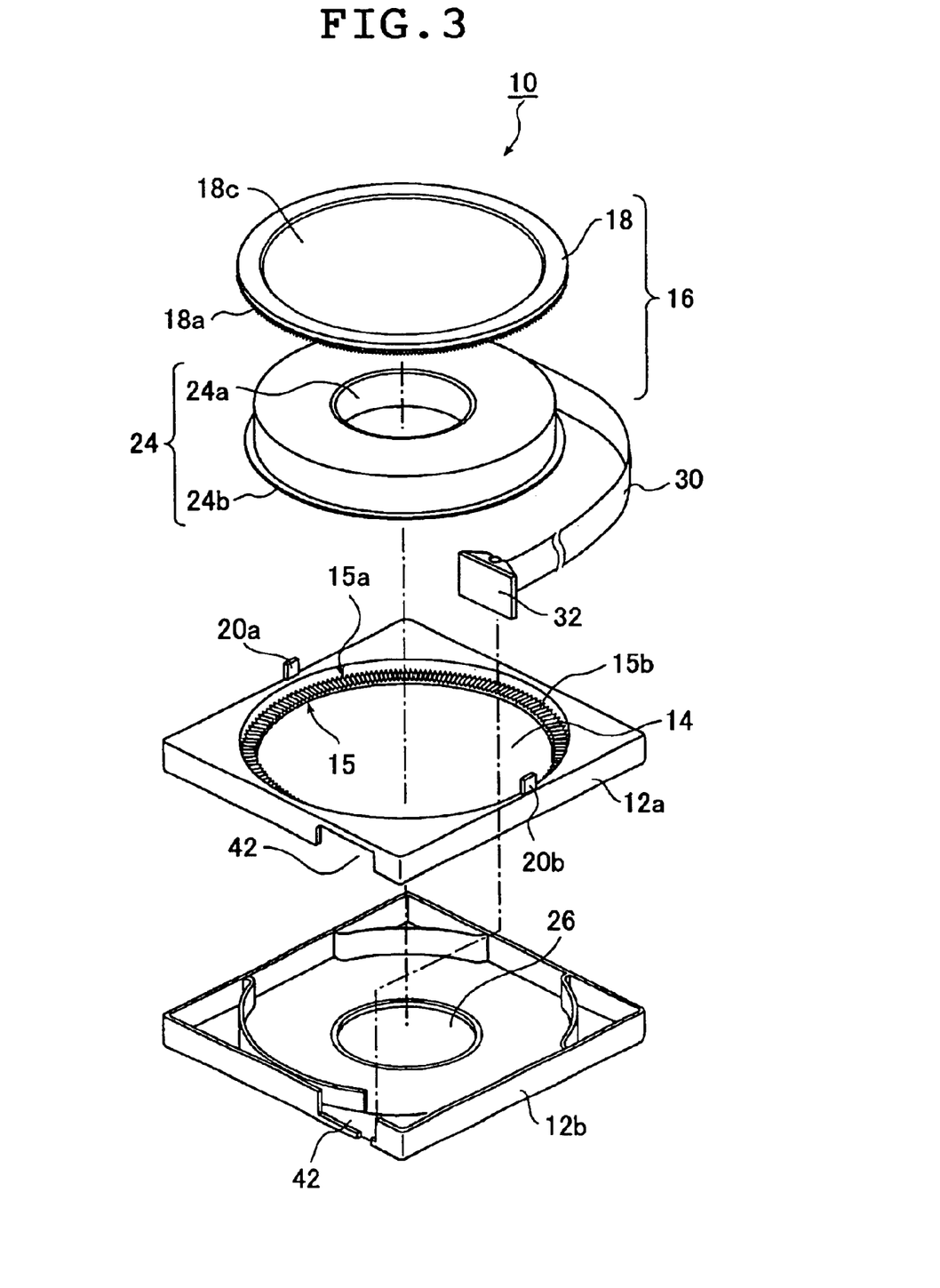
FIG. 3 is an exploded perspective view showing a schematic configuration of the magnetic tape cartridge shown in FIG. 1.

As shown in FIGS. 1 to 3, a magnetic tape cartridge 10 in accordance with this embodiment is provided with a characteristic of a first aspect of the present invention in which one of two flanges composing a reel 16 (an upper flange 18 in the illustrated embodiment) constitutes a central main portion on the upper side of a cartridge case 12 and a characteristic of a second aspect of the present invention in which an opening 42 for drawing out a magnetic tape 30 guided by a leader block 32 from the cartridge case 12 is formed in a position apart from the corner of the cartridge case 12.

That is, more specifically, the magnetic tape cartridge 10 of the illustrated embodiment is characterized by the following two points. First, a circular opening 14 is formed in an upper case 12a on the upper side of the cartridge case 12, and thus the cartridge case 12 does not form a complete housing like a cartridge case 56 (see FIGS. 7 and 8) of the conventional magnetic tape cartridge 60, and further the upper flange 18 of the reel 16 closes the opening 14 of the upper case 12a on the upper side of the cartridge case 12 when the reel 16 is being mounted, thereby forming the central main portion on the upper side of the cartridge case 12. Second, the opening 42 for drawing out the magnetic tape 30 guided by the leader block 32 from the magnetic tape cartridge 10 is formed in a position apart from the corner of the cartridge case 12, that is, a position apart therefrom by a distance equivalent to approximately one fourth of the length of the side (edge) of the cartridge case 12.

The above-mentioned cartridge case 12 is constructed by assembling the upper case 12a and a lower case 12b with machine screws (not shown) or the like. In addition, reel stoppers 20a and 20b for elastically holding the reel 16 are provided on the upper side of the upper case 12a so that the reel 16 is not unwantedly disengaged from the cartridge case 12. The reel stoppers 20a and 20b are able to pivot or rotate within the vertical plane and is urged or biased downward or toward the upper case 12a by a not-shown torsion spring.

In addition, the upper side of the upper case 12a of the above-mentioned cartridge case 12 has a circular cutout portion 15 which is concentric with the circular opening 14 and which has a diameter larger than that of the opening 14. A portion along the periphery of the circular opening 14 in which the cutout portion 15 abuts the reel 16 is recessed by one step thus forming an annular stepped portion 15a. The outer diameter of the upper flange 18 of the reel 16 is smaller than the inner diameter of the circular cutout portion 15 so that the upper flange 18 can be fitted in the annular stepped portion 15a. In this way, the upper surface of the upper flange 18 of the reel 6 is prevented from protruding from the upper surface of the upper case 12a.

Moreover, the periphery on the lower side of the upper flange 18 of the reel 16 is provided with an annular stepped portion 18a having cutouts (upward recesses; see FIG. 2). The above-mentioned stepped portion 15a and the annular stepped portion 18a abutting the portion 15a have gear teeth 15b and 18b that engage with each other such that unwanted pivot or rotational movement (rotation) of the reel 16 which is fitted in the stepped portion 15a of the cartridge case 12 and is in a stand-by position can be prevented.

It should be noted that the reel 16 is mounted in the cartridge case 12 so as to close the opening 14 of the upper case 12a by its dead weight after having been inserted through the opening 14 into the cartridge case 12.

Further, the above-mentioned rotational movement preventing mechanism, which prevents a rotational or pivot movement of the reel 16 by means of the fitting of the gear teeth 15b and 18b with each other in the state in which the reel 16 has been fitted in the stepped portion 15a of the cartridge case 12, functions by means of the dead weight of the reel 16 and the weight of the magnetic tape 30 wound around the reel 16 (dead weight of the reel 16 around which the magnetic tape 30 is wound). Thus, it is unnecessary to specifically provide a special urging (biasing) unit, pressing mechanism or the like for preventing the rotational or pivot movement.

Here, it is possible to appropriately set shapes, sizes and the like of the gear teeth 15b and 18b that are formed on the upper side of the upper case 12a of the cartridge case 12 and on the lower side of the upper flange 18 of the reel 16, respectively. In addition, it is preferable to continuously form the gear teeth 15b and 18b on both the respective sides or surfaces. However, at least one of the gear teeth 15b and 18b may be formed discontinuously.

The reel stoppers 20a and 20b in the foregoing description are pivotable or rotatable within the identical vertical plane. However, the reel stoppers may also be pivotable or rotatable within the identical horizontal plane. In either case and in particular in the type of pivot movement or rotation within the horizontal plane, the reel stoppers 20a and 20b are preferably arranged to be retracted in accordance with the loading operation of the cartridge case 12 loaded into a recording/reproducing apparatus (drive mechanism) such as an external storage apparatus, in the direction in which the engagement of the reel 16 is released.

Moreover, although it is not clear from FIG. 2, it is preferable to determine a dimension of each portion such that the upper side of the upper flange 18 of the reel 16 is at a slightly recessed position relative to a side wall upper end portions 22a of the upper case 12a of the cartridge case 12 in the state in which the reel 16 has been fitted in the stepped portion 15a of the cartridge case 12. It is needless to say that this is for not applying direct load (pressure from above) onto the reel 16.

The illustrated magnetic tape cartridge 10 is configured as follows: The upper flange 18 of the reel 16 is arranged parallel with the lower flange 24 so that the flanges 18 and 24 can be opposed to each other and has an outer diameter larger than that of the lower flange 24; and the circular opening 14 of the upper case 12a of the cartridge case 12 has an inner diameter smaller than the outer diameter of the upper flange 18 of the reel 16 but larger than the outer diameter of the lower flange 24.

The central portion on the upper side of the upper flange 18 or the central circular portion excluding the portion corresponding to the annular stepped portion 18a in the illustrated case has preferably a portion to be cut 18c for its moldability and quality improvement.

As described above, the lower flange 24 of the reel 16 mounted on the central portion is provided with a cylindrical reel hub 24a around the circumference of which the magnetic tape 30 is wound; a circular flange portion 24b that is integrally molded with the reel hub 24a and supports the wound magnetic tape 30; and engaging portions which engages a rotational driving unit of a drive for rotatably driving the reel 16, for example a rotary shaft, as exemplified by a reel plate 24c provided on the center of the bottom external surface of the reel hub 24a for magnet type junction and a drive chucking 24d provided outside the reel plate 24c for engagement by another method. The rotational driving unit of the drive (rotary shaft) is inserted through a circular opening 26 in the center of the lower case 12b.

Since the constructions and operations of the lower flange 24 of the reel 16 and portions below the flange 24 are completely the same as those of the above-described conventional magnetic tape cartridge, detailed description thereof is omitted here.

In the magnetic tape cartridge 10 in accordance with this embodiment, which is constructed as described above, the upper case 12a of the cartridge case 12 and the upper flange 18 of the reel 16 are formed substantially as one component. Thus, it becomes possible to reduce the thickness of the magnetic tape cartridge 10 by an amount equivalent to the thickness reduced as a result of forming them as one component and, in addition, it may also contribute to saving of components and materials for forming them.

Moreover, in the magnetic tape cartridge in accordance with this embodiment, the conventionally used opening 42 through which the magnetic tape 30 guided by the leader block 32 is inserted into or drawn out from the cartridge case 12 (magnetic tape drawing-out port) is arranged at a position apart from the corner of the cartridge case 12 by a distance equivalent to approximately one quarter of the length of the side (edge) of the cartridge case 12. Further, the leader block 32 is fitted in the opening 42 to be fixed and forms a part of the side wall of the cartridge case 12 of the magnetic tape cartridge 10.

Due to the construction as described above, even if the magnetic tape cartridge 10 is dropped due to some cause and hits a floor or the like at its corner, the above-mentioned opening 42 is not directly damaged. As a result, reliability of the magnetic tape cartridge 10 and therefore of data recorded in the magnetic tape 30 inside it can be improved.

Figure 4:
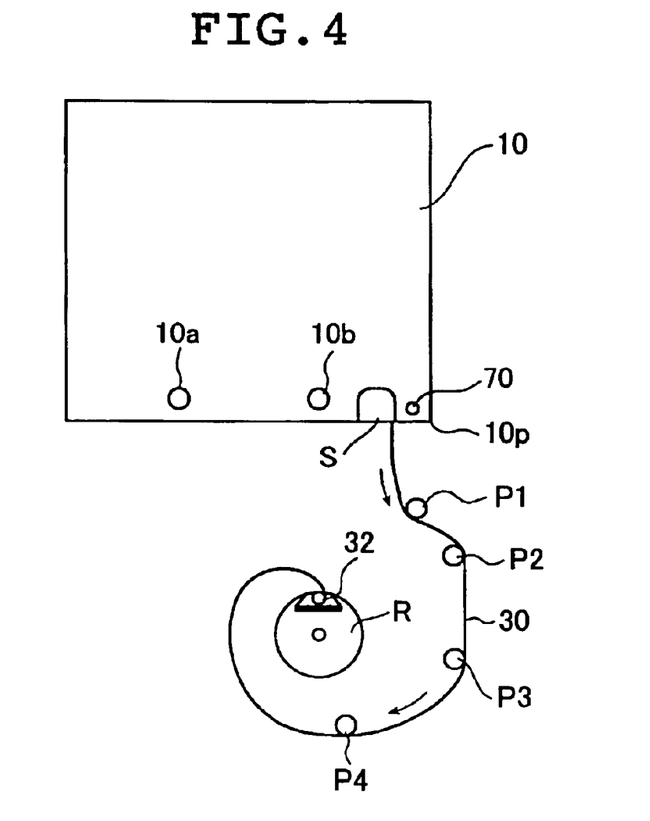
FIG. 4 is an explanatory diagrammatic view of schematic operations for illustrating a relation between the magnetic tape cartridge shown in FIG. 1 and a magnetic tape conveying mechanism of a drive of a recording/reproducing apparatus.

A positional relation between the magnetic tape cartridge 10 in accordance with this embodiment and a magnetic tape conveying mechanism of a drive of the recording/reproducing apparatus will now be described. FIG. 4 is an explanatory diagrammatic view of schematic operations for illustrating a relation between the magnetic tape cartridge 10 in accordance with this embodiment and a driving mechanism of the recording/reproducing apparatus such as an external storage apparatus. In the figure, reference symbols 10a and 10b denote reference holes of the magnetic tape cartridge 10, and reference character S denotes a position of a magnetic tape drawing-out port (opening 42). Also, P1, P2, P3 and P4 denote magnetic tape guide pins on the drive side and R denotes a machine reel.

Here, the magnetic tape guide pins P1, P2, P3 and P4 on the drive side and the machine reel R are arranged according to the positional relation as shown in FIG. 4. If the magnetic tape cartridge 10 is set in the drive, the leader block 32 guiding the magnetic tape 30 is drawn while passing through the peripheries of the magnetic tape guide pins P1, P2, P3 and P4 along a route shown by an arrow, to be set in a leader pin receiving portion of the machine reel R.

As is evident from the exemplary embodiment shown in FIG. 4, the position S of the magnetic tape drawing-out port (opening 42) of the magnetic tape cartridge 10 is on the outer side with respect to the reference hole (here, 10b) of the magnetic tape cartridge 10 but on the inner side with respect to the corner 10p of the cartridge case 12 of the magnetic tape cartridge 10. In an exemplary embodiment of the present invention, the magnetic tape drawing-out port (opening 42) is provided between a position corresponding to a screw hole 70 used for assembling upper and lower cases 12a, 12b and provided in the corner 10p of the cartridge case 12, and a position corresponding to a reference hole (here, 10b) provided in the vicinity of a central portion of the cartridge case 12.

Operations of the magnetic tape cartridge 10 in accordance with this embodiment are as follows. That is, as described above, when it is not used, the above-mentioned rotational movement preventing mechanism realized by means of the fitting of the gears teeth 15b and 18b with each other, functions due to the weight (dead weight) of the reel 16 and the magnetic tape 30 wound around the reel 16 in the state in which the reel 16 has been fitted in the stepped portion 15a of the cartridge case 12, whereby the pivot movement or rotation of the reel 16 is prevented.

In addition, when the magnetic tape cartridge 10 in accordance with this embodiment is loaded into an external storage apparatus, the magnetic tape 30 becomes ready for being drawn out from the tape drawing-out port (opening 42) of the magnetic tape cartridge 10 into the external storage apparatus by means of the leader block 32. At the same time, the reel 16 in the cartridge case 12 becomes ready for being rotated via the drive chucking 24d disposed in the central portion of the magnetic tape cartridge 10.

Further, prior to the above operation, the central portion of the magnetic tape cartridge 10 is pushed up by the components on the drive side of the external storage apparatus, whereby the fitting of the gear teeth 15b and 18b with each other between the upper case 12a of the cartridge case 12 of the magnetic tape cartridge 10 and the upper flange 18 of the reel 16 comes off and the restriction on the rotation of the reel 16 is released. As a result, it becomes possible to drive the reel and draw out the magnetic tape from the drive side.

The magnetic tape 30 is drawn out from the drive side in this state and necessary magnetic processing such as recording and reproduction is carried out. When this processing ends, the magnetic tape 30 is wound (rewound) around the reel 16 in the cartridge case 12 of the magnetic tape cartridge 10. When the rewinding is completed, the magnetic tape cartridge 10 is ejected from the external storage apparatus. Synchronously with this movement, the tape drawing-out port (opening 42) of the magnetic tape cartridge 10 is closed by means of the reader block 32 and the rotational movement preventing brake (fitting of the gear teeth 15b and 18b) of the reel 16 is activated to prevent any further unwanted rotational or pivot movement of the reel 16.

The magnetic tape cartridge 10 shown in the above-mentioned embodiment employs a construction based on a new concept that is completely different from the conventional one. Thus, there is an effect in that it becomes possible to reduce the number of components and costs when constructing the magnetic tape cartridge by combining the reel 16 and the cartridge case 12, while maintaining respective functions of the reel 16 and the cartridge case 12.

In addition, in the magnetic tape cartridge 10 shown in the above-mentioned embodiment, the position S of the magnetic tape drawing-out port (opening 42) is on the outer side with respect to the reference hole (here, 10b) of the magnetic tape cartridge 10 but on the inner side with respect to the corner 10p of the cartridge case 12 of the magnetic tape cartridge 10, as shown in FIG. 4. Thus, the magnetic tape cartridge 10 has a characteristic that it is unlikely to be damaged even if it is accidentally subjected to careless handling such as rough handling or dropping thereof.

Further, the magnetic tape cartridge in accordance with the above-mentioned embodiment is provided with the characteristics of the first and the second aspects of the present invention. However, the magnetic tape cartridge in accordance with the present invention may be provided with only the characteristic of the first aspect as shown in FIG. 5, or may be provided with only the characteristic of the second aspect as shown in FIG. 6.

Figure 5:
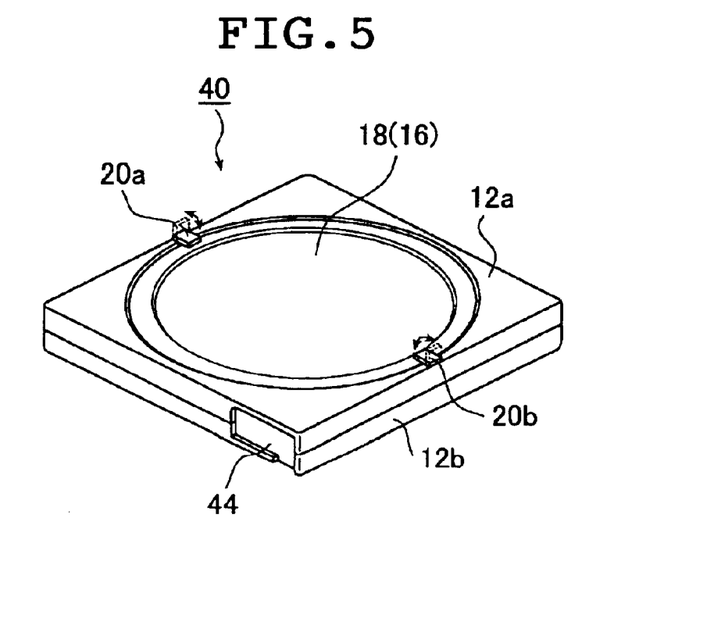
FIG. 5 is a perspective view showing a schematic configuration of another embodiment of a magnetic tape cartridge in accordance with the present invention.

That is, like the magnetic tape cartridge 40 shown in FIG. 5, it may have the same characteristic as that of the magnetic tape cartridge 10 shown in FIG. 1 in that the circular opening 14 is formed in the upper case 12a of the cartridge case 12 and that the upper flange 18 of the reel 16 closes the opening 14 to form the central main portion on the upper side of the cartridge case 12. However, an opening 44 for drawing out the magnetic tape 30 guided by the leader block 32 from the magnetic tape cartridge 40 may be provided at its corner as in the conventional magnetic tape cartridge 60.

Figure 6:
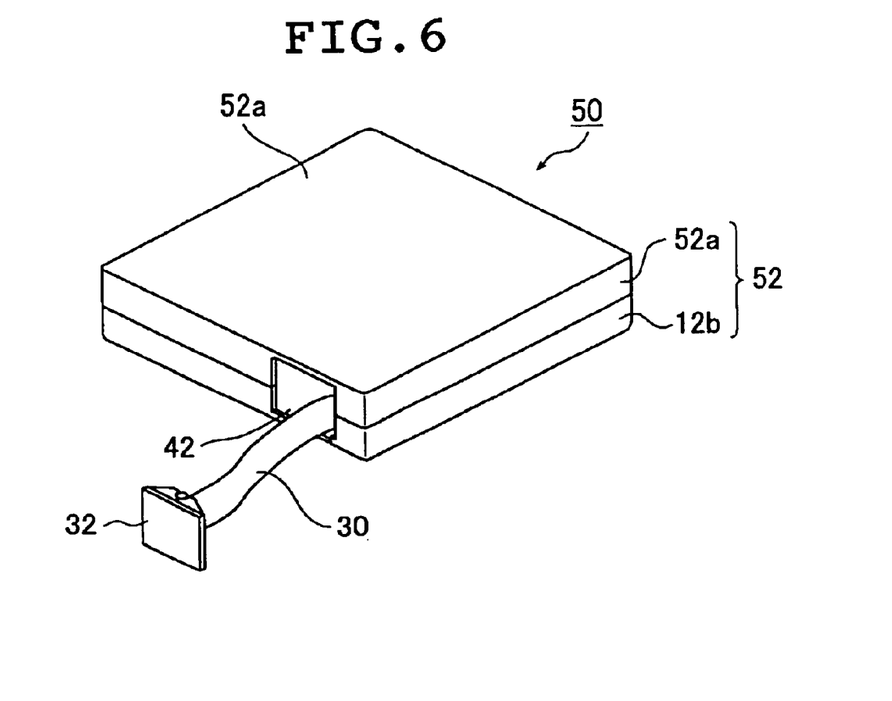
FIG. 6 is a perspective view showing a schematic configuration of still another embodiment of a magnetic tape cartridge in accordance with the present invention.

In addition, like the magnetic tape cartridge 50 shown in FIG. 6, it may have the same characteristic as that of the magnetic tape cartridge 10 shown in FIG. 1 in that the opening 42 for drawing out from the cartridge case 52 the magnetic tape 30 guided by the leader block 32 is provided in a position apart from the corner of the cartridge case 52, that is, in a position apart therefrom by a distance equivalent to approximately one quarter of the length of the side (edge) of the cartridge case 52. In addition, the magnetic tape cartridge may have, with respect to constructions other than this such as the construction of the upper and the lower cases 52a and 12b of the cartridge case 52 as well as the upper and the lower flanges 54 and 24 of the reel 56, the same construction as that in the conventional magnetic tape cartridge 60.

Further, it is needless to say that the above-mentioned embodiments simply show examples of the present invention, respectively, and the present invention is not limited to these embodiments. For example, it is possible to provide the above-mentioned braking mechanism using the gear teeth between the upper side of the lower case 12b of the cartridge case 12 and the lower flange 24 of the reel 16 in the magnetic tape cartridges 10 and 40 shown in FIGS. 1 to 5, although this would slightly reduce the effect of the present invention in reducing the total thickness of the magnetic tape cartridge.

Since the opening 14 on the upper side of the cartridge case 12 is large in the magnetic tape cartridges 10 and 40 shown in FIGS. 1 to 5, it becomes also possible to integrally mold the entire cartridge case 12 instead of separately molding the upper case 12a and the lower case 12b and then assembling them together by machine screws or the like as in the conventional art. In this case, there is attained a practical effect in that the number of assembling steps for assembling a magnetic cartridge case is reduced.

Moreover, in the magnetic tape cartridges 10 and 50 shown in FIGS. 1 to 4 and FIG. 6, the magnetic tape drawing-out port (opening 42), which becomes a passage through which the magnetic tape 30 is drawn out from the cartridge cases 12 and 52 and rewound, is provided at a position apart from the corners of the cartridge cases 12 and 52. Thus, there is attained an effect in that the magnetic tape cartridges are unlikely to be damaged even if they are accidentally subjected to careless handling such as rough handling or dropping thereof.

The magnetic tape cartridge in accordance with the present invention has been described referring to various embodiments. It is needless to say that the present invention is not limited to the above-mentioned each embodiment but various improvement and modifications may be made without departing from the sprit and the scope of the present invention.

As described above in detail, according to the first aspect of the present invention, there is attained an effect that a magnetic tape cartridge can be realized with which it becomes possible to reduce the number of components and costs while maintaining respective functions of a reel and a cartridge case when constructing the magnetic tape cartridge by combining the reel and the cartridge.

That is, according to the first aspect of the present invention, a circular cutout portion larger in size than an upper flange of the above-mentioned reel is formed on the upper side of the cartridge case, and a stepped portion of the above-mentioned upper flange, which is formed to have a step, fits in this cutout portion. As a result, it has become possible to form the upper side of the cartridge case and the upper flange of the reel as substantially one component. Then, due to such construction, it has become possible to provide a magnetic tape cartridge that has a reduced total thickness and is also advantageous in terms of costs.

In addition, according to the second aspect of the present invention, there is attained a remarkable effect that a magnetic tape cartridge can be realized which is unlikely to be damaged even if it is subjected to careless handling.

Further, a magnetic tape cartridge constructed as having characteristics of both the first and the second aspects of the present invention may enjoy both of the above-mentioned effects.

What is claimed is:

1. A magnetic tape cartridge comprising:
    a single reel including a circular lower flange in which an engaging portion for engaging a rotary shaft of a recording/reproducing apparatus is centered, and a circular upper flange which is arranged so as to be opposed to the lower flange and has an outer diameter larger than the outer diameter of the lower flange, said single reel being integrally configured with said upper flange and said lower flange;
    a magnetic tape which is wound between said upper flange and said lower flange of said single reel; and
    a cartridge case within which said single reel is rotatably accommodated and which includes a lower case into which said rotary shaft is inserted and which has a first opening at a position corresponding to the engaging portion of said lower flange, and an upper case which has a circular second opening having an inner diameter larger than the outer diameter of said lower flange but smaller than the outer diameter of said upper flange, said cartridge case being integrally configured with said upper case and said lower case;
    wherein said upper flange closes the circular second opening of said upper case to form a central portion on an upper side of said cartridge case.

2. The magnetic tape cartridge according to claim 1, wherein said upper case comprises a circular cutout portion which is provided on an upper side of said upper case along said circular second opening and has an inner diameter larger than the outer diameter of said upper flange, and wherein said upper flange comprises an annular stepped portion which is provided circumferentially on a lower side of said upper flange and fits in the circular cutout portion of said upper case from an upper side.

3. The magnetic tape cartridge according to claim 2, wherein a movement preventing unit for preventing relative movement of said upper case of said cartridge case and said upper flange is formed on an upper side of said circular cutout portion of said upper case and a lower side of said stepped portion of said upper flange abutting said upper side of said circular cutout portion.

4. The magnetic tape cartridge according to claim 3, wherein said single reel is mounted in said cartridge case by means of its dead weight and said movement preventing unit functions also by means of the dead weight of said reel and a weight of said magnetic tape wound around said reel.

5. The magnetic tape cartridge according to claim 1, wherein at least two reel engaging units are provided on an upper side of said upper case to engage said upper flange and prevent said single reel from being unwantedly disengaged from said cartridge case.

6. The magnetic tape cartridge according to claim 5, wherein each of said at least two reel engaging units includes an urging unit for urging said upper flange toward said upper case.

7. The magnetic tape cartridge according to claim 5, wherein engagement of said upper flange of said single reel by each of said at least two reel engaging units is released when the magnetic tape cartridge is loaded into said recording/reproducing apparatus.

8. The magnetic tape cartridge according to claim 1, wherein a magnetic tape drawing-out port, which becomes a passage for drawing out said magnetic tape from said cartridge case and rewinding said magnetic tape into said cartridge case, is provided on a side surface of said cartridge case at a position apart from a corner of said cartridge case.

9. The magnetic tape cartridge according to claim 8, wherein said magnetic tape drawing-out port is provided between a position corresponding to a screw hole used for assembling upper and lower cases and provided in the corner of said cartridge case, and a position corresponding to a reference hole provided on a lower side of said cartridge case in the vicinity of a central portion of said cartridge case.

10. The magnetic tape cartridge according to claim 8, wherein a central position of said magnetic tape drawing-out port is located at a position apart from the corner of said cartridge case by a distance equivalent to approximately one quarter of an edge length of the side surface of said cartridge case.

11. The magnetic tape cartridge according to claim 8, wherein a drawing-out member, provided at one end of said magnetic tape, is a leader block which fits in said magnetic tape drawing-out port and forms a part of said side wall when the leader block is in a state of disuse.

12. A magnetic tape cartridge comprising:

a single reel including a circular lower flange in which an engaging portion for engaging a rotary shaft of a recording/reproducing apparatus is centered, and a circular upper flange which is arranged so as to be opposed to the lower flange and has an outer diameter larger than the outer diameter of the lower flange, said single reel being integrally configured with said upper flange and said lower flange;

a magnetic tape which is wound between said upper flange and said lower flange of said single reel; and a cartridge case within which said single reel is rotatably accommodated and which includes a separate lower case into which said rotary shaft is inserted and which has a first opening at a position corresponding to the engaging portion of said lower flange, and a separate upper case which has a circular second opening having an inner diameter larger than the outer diameter of said lower flange but smaller than the outer diameter of said upper flange, said cartridge case being integrally configured with said upper case and said lower case;

wherein said upper flange closes the circular second opening of said upper case to form a central portion on an upper side of said cartridge case.

13. The magnetic tape cartridge according to claim 12, wherein said upper case comprises a circular cutout portion which is provided on an upper side of said upper case along said circular second opening and has an inner diameter larger than the outer diameter of said upper flange, and wherein said upper flange comprises an annular stepped portion which is provided circumferentially on a lower side of said upper flange and fits in the circular cutout portion of said upper case from an upper side, and wherein said circular cutout portion of said upper case extends substantially perpendicular to a side surface of said cartridge.

14. The magnetic tape cartridge according to claim 12, wherein a magnetic tape drawing-out port, which becomes a passage for drawing out said magnetic tape from said cartridge case and rewinding said magnetic tape into said cartridge case, is provided on a side surface of said cartridge case at a position apart from a corner of said cartridge case, and wherein a drawing-out member is provided at one end of said magnetic tape and said magnetic tape is drawn out of said magnetic tape drawing-out port by said drawing-out member.

* * * * *